United States Patent
Park et al.

(10) Patent No.: US 9,874,435 B2
(45) Date of Patent: Jan. 23, 2018

(54) MEASURING SYSTEM AND MEASURING METHOD

(71) Applicant: Samsung Electronics Co., Ltd., Suwon-si, Gyeonggi-do (KR)

(72) Inventors: Sangwook Park, Suwon-si (KR); Sang-Hyun Park, Seoul (KR); Taekyu Son, Seongnam-si (KR); Sangdon Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 310 days.

(21) Appl. No.: 14/667,930

(22) Filed: Mar. 25, 2015

(65) Prior Publication Data

US 2015/0338206 A1  Nov. 26, 2015

(30) Foreign Application Priority Data

May 22, 2014  (KR) .................. 10-2014-0061726
Jun. 25, 2014  (KR) .................. 10-2014-0078189

(51) Int. Cl.
*G01B 11/14*  (2006.01)
*G01B 9/02*  (2006.01)

(52) U.S. Cl.
CPC .......... *G01B 11/14* (2013.01); *G01B 9/02016* (2013.01)

(58) Field of Classification Search
CPC .. G01B 11/002; G01B 11/14; G01B 9/02016; G01B 9/02019; G01B 9/02061; G01B 9/0207
USPC ........................................ 356/500
See application file for complete search history.

(56) References Cited

U.S. PATENT DOCUMENTS

| | | | | |
|---|---|---|---|---|
| 6,486,955 B1 * | 11/2002 | Nishi | ................ | G01B 11/002 356/401 |
| 6,860,020 B2 | 3/2005 | Pahk et al. | | |
| 7,193,721 B2 * | 3/2007 | Zhu | ................ | G01B 9/02019 356/486 |
| 7,224,466 B2 * | 5/2007 | Ray | ................ | G01B 9/02027 356/493 |
| 7,633,619 B2 | 12/2009 | Kwan | | |

(Continued)

FOREIGN PATENT DOCUMENTS

JP   H09311024 A   12/1997
JP   2006071513 A   3/2006

(Continued)

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

Measuring systems and methods using the same may be provided. For example, the measuring system including a first reference member located at one of a first target member and a second target member, the first and second target members being configured to make a relative movement with respect to each other and the first reference member having a first length, a second reference member located at the other of the first target member and the second target member and having a second length, and a measuring unit located at a distance from the first reference member and the second reference member, the measuring unit configured to measure a relative location of one of the first reference member and the second reference member with respect to the other may be provided.

20 Claims, 6 Drawing Sheets

(56) References Cited

U.S. PATENT DOCUMENTS

| | | |
|---|---|---|
| 7,907,287 B2 | 3/2011 | Sekiguchi |
| 8,229,207 B2 | 7/2012 | Tamamushi |
| 9,261,800 B2* | 2/2016 | de Boer .............. G03F 7/70775 |
| 2002/0167675 A1* | 11/2002 | Inoue .................. G03F 7/70775 |
| | | 356/493 |
| 2003/0210404 A1* | 11/2003 | Hill .................... G01B 11/2441 |
| | | 356/500 |
| 2004/0149067 A1 | 8/2004 | Pahk et al. |
| 2008/0098813 A1 | 5/2008 | Sekiguchi |
| 2008/0309950 A1 | 12/2008 | Kwan |
| 2009/0073458 A1* | 3/2009 | Heiden ................ G01B 11/005 |
| | | 356/500 |
| 2010/0074513 A1 | 3/2010 | Tamamushi |
| 2010/0097591 A1* | 4/2010 | Kim .................... G03F 7/70791 |
| | | 355/53 |
| 2010/0235955 A1* | 9/2010 | Humphris .............. B82Y 35/00 |
| | | 850/6 |
| 2012/0250030 A1* | 10/2012 | de Boer .............. G03F 7/70775 |
| | | 356/498 |
| 2012/0268725 A1* | 10/2012 | De Boer ............... G03F 9/7088 |
| | | 355/72 |
| 2013/0016361 A1* | 1/2013 | Park .................... G01B 11/002 |
| | | 356/500 |
| 2014/0268171 A1* | 9/2014 | Jang ................... G01N 21/9501 |
| | | 356/500 |

FOREIGN PATENT DOCUMENTS

| | | |
|---|---|---|
| KR | 1020030039676 B1 | 6/2004 |
| KR | 20130008826 A | 1/2013 |
| KR | 1020120111815 B1 | 1/2013 |
| KR | 1020140114500 A | 9/2014 |

\* cited by examiner

MEASURING SYSTEM AND MEASURING METHOD

CROSS-REFERENCE TO RELATED APPLICATIONS

This U.S. non-provisional patent application claims priority under 35 U.S.C. § 119 of Korean Patent Application Nos. 10-2014-0061726, filed on May 22, 2014, and 10-2014-0078189, filed on Jun. 25, 2014, the entire contents of which are hereby incorporated by reference.

BACKGROUND OF THE INVENTION

Example embodiments disclosed herein relate to measuring systems and/or measuring methods.

A mechanical device may be provided such that one component moves relative to another component. For example, a first component may be provided to move in a direction with a workpiece supported thereon, and a second component may be configured to perform a certain process on the workpiece placed on the first component. The first component may move on a 1D line, a 2D plane or in a 3D space.

On a mechanical device, a component movably provided has to move according to a designed value. However, a component of the mechanical device may have a deviation with respect to a moving direction while moving due to an error in a manufacturing process. Such an error may cause malfunction of the mechanical device or cause quality degradation of the processed workpiece.

SUMMARY OF THE INVENTION

Some example embodiments provide measuring systems and/or measuring methods that may measure the relative location of one of a first target member and a second target member, which mutually make a relative movement with respect to the other in a measuring direction perpendicular to reference directions.

Some example embodiments also provide a measuring system in which a movable, long distance is formed while the relative location of a second target member with respect to a first target member is measured in the measuring direction, and/or a measuring method.

Some example embodiments also provide a measuring system and/or a measuring method that may correct an error that measured data includes.

According to an example embodiment, a measuring system includes a first reference member located at one of a first target member and a second target member, the first and second target members being configured to move to each other, and the first reference member having a first length, a second reference member located at the other of the first target member and the second target member, the second reference member having a second length, and a measuring unit located at a distance from the first reference member and the second reference member, the measuring unit configured to measure a relative location of one of the first reference member and the second reference member with respect to the other.

According to an example embodiments, a measuring method include moving a second reference member relative to a first reference member in a length direction thereof, radiating, by a measuring unit, a first light to the first reference member and a second light to the second reference member in a direction perpendicular to the length direction such that the first light reflected from the first reference member and the second light reflected from the second reference member interfere with each other, and measuring a relative location of one of the first reference member and the second reference member with respect to the other based on the interference of the reflected first light and the reflected second light.

According to an example embodiment, a measuring system includes a first reference member and a second reference member, at least one of the first and second reference members configured to move relative to the other in a first direction, and a sensor configured to radiate measuring lights at a distance to the first reference member and the second reference member, respectively, and receive reflected measuring lights such that the reflected measuring lights interfere with each other, and a controller configured to determine a relative location of one of the first reference member and the second reference member with respect to the other based on the reflected measuring lights interfering with each other.

BRIEF DESCRIPTION OF THE DRAWINGS

The accompanying drawings are included to provide a further understanding of the example embodiments, and are incorporated in and constitute a part of this specification. The drawings illustrate some example embodiments of the present invention and, together with the description, serve to explain principles of the example embodiments. In the drawings.

DETAILED DESCRIPTION

Figure 1:
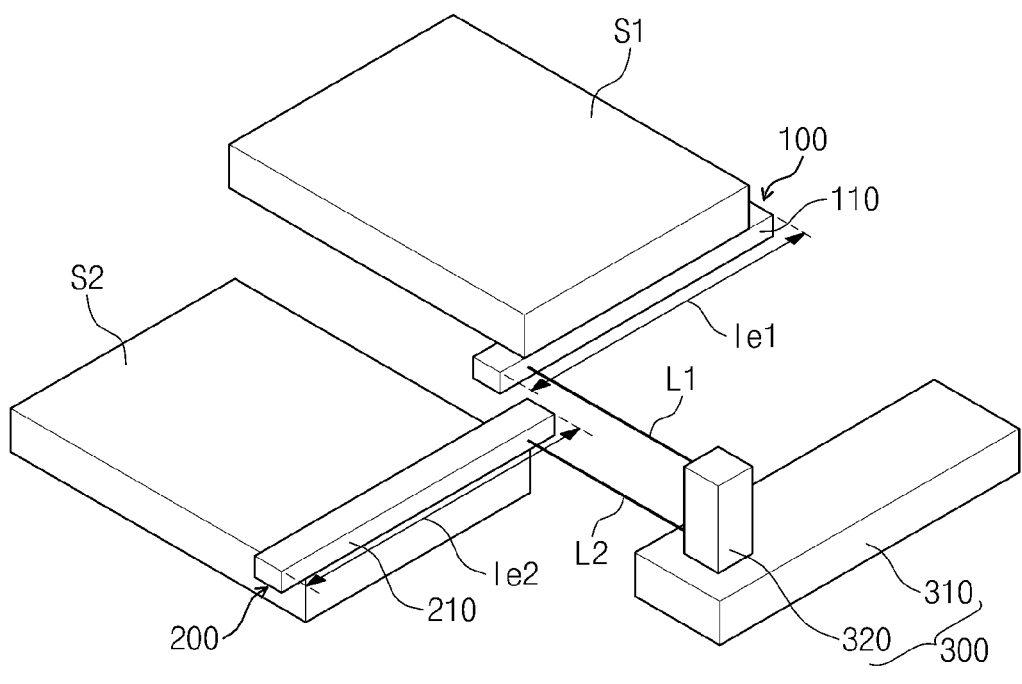
FIG. 1 represents a measuring system according to an example embodiment of the present inventive concepts.

Some example embodiments are described below in more detail with reference to the accompanying drawings. The example embodiments may be implemented in many forms, and it should not be construed that the scope of the present inventive concepts is limited to the following example embodiments. The example embodiments are provided to more fully explain the present inventive concepts to a person skilled in the art. Thus, the shapes of elements in the drawings are exaggerated to emphasize a more clear description.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, some example embodiments will be explained in further detail with reference to the accompanying drawings.

FIG. 1 represents a measuring system according to an example embodiment of the present inventive concepts.

Referring to FIG. 1, a measuring system 10 includes a first reference member 100, a second reference member 200 and a measuring unit 300.

A direction that is a reference direction for measuring a location of one of a first target member S1 and a second target member S2 with respect to the other is called a first direction X, a direction that is perpendicular to the first direction when viewed from above is called a second direction Y, and a direction that is perpendicular to the first direction X and the second direction Y is called a third direction Z.

According to an example embodiment, the first target member S1 is provided to move on a 1D line in the first direction X (e.g., a reference direction), and the measuring system 10 measures an error of the first target member S1 in the second direction Y (e.g., a measuring direction with respect to the reference direction). However, the first target member S1 may move on a 2D plane that includes the first direction X and the second direction Y. Further, the measuring system 10 may adopt the first direction X as a reference direction and may use the first direction X to measure a location of the first target member S1 in the second direction Y with respect to a location of the second target member S2. The first target member S1 may move in a 3D space. In such cases, the measuring system 10 may adopt one of the first direction X to the third direction Z as a reference direction and may use the adopted reference direction to measure a location of the first target member S relative to the second target member S2 in a measuring direction perpendicular to the reference direction. The measuring system 10 measures a relative location of one of the first target member S1 and the second target member S2 with respect to the other in one direction (e.g., a measuring direction perpendicular to a reference direction along which target members are provided).

The first reference member 100 may be located at one of the first target member S1 and the second target member S2, and the second reference member 200 may be located at the other of the first target member S1 and the second target member S2. According to an example embodiment, the first reference member 100 may be located at the first target member S1 and the second reference member 200 may be located at the second target member S2.

The first target member S1 and the second target member S2 may be provided as structures that have certain volumes. Each of the first target member S1 and the second target member S2 may be a component of a mechanical device. For example, the first target member S1 and the second target member S2 may be components of a mechanical device used for producing a display panel. One of the first target member S1 and the second target member S2 may be a stage moving in the first direction X having a substrate supported thereon, and the other may be a component that is located on a path, through which the substrate moves, to process the substrate. For example, a substrate processing process may include a process of applying a chemical to the substrate by using a droplet ejection technique or an inkjet technique, a process of drying the chemical applied to the substrate, a light-exposure process of radiating a light to the chemical applied to the substrate to form a pattern, and a process of drying the substrate or a process of inspecting the substrate.

Each of the first target member S1 and the second target member S2 may be a separate mechanical device or a separate component of a mechanical device. Further, one of the first target member S1 and the second target member S2 may perform a certain operation, while moving relative to the other. For example, the first target member S1 and the second target member S2 may cooperate with each other. The first target member S1 may move on a 1D line, a 2D plane or a 3D space.

According to an example embodiment, the first target member S1 may be fixed, the second target member S2 may move 1-dimensionally in the first direction X, and the first target member S1 may be located relatively higher than the second target member S2 in the third direction Z. However, the locations and relative movements of the first target member S1 and the second target member S2 are not limited thereto. According to some example embodiments, the first target member S1 may move and the second target member S2 may be fixed. The second target member S2 may also be located relatively higher than the first target member S1 in the third direction Z. According to some example embodiments, one of the first target member S1 and the second target member S2 may move relative to the other in the second direction Y or in the third direction Z. According to some example embodiments, one of the first target member S1 and the second target member S2 may move relative to the other on a 2D plane or a 3D space.

The first reference member 100 may be provided with a rod shape having a first length le1. The first reference member 100 is attached to the external surface of the first target member S1 so that the length direction of the first reference member has the first direction X (e.g., the reference direction). For example, the first reference member 100 may be attached to at least one of the top, side and bottom surfaces of the first target member S1. One surface of the first reference member 100 may include a first inspection surface 110. The first inspection surface 110 may be formed as a plane. The first inspection surface 110 may be provided on a side of the first reference member 100 perpendicular to the length direction of the first reference member 100. The first inspection surface 110 may be provided with a material that may reflect light. For example, the first inspection surface 110 may be provided with a mirror. According to an example embodiment, the first inspection surface 110 may be separately prepared and attached to the external surface of the first reference member 100. According to an example embodiment, the first inspection surface 110 may also be integrated with some other parts of the first reference member 100. The first reference member 100 may be attached to the first target member S1 so that the first inspection surface 110 receives an incident light in a direction perpendicular to the first direction X (e.g., the reference direction). For example, the first reference member 100 may be attached to the first target member S1 so that the first inspection surface 110 receives an incident light in the second direction Y (e.g., the measuring direction). Also, the first reference member 100 may also be attached to the first target member S1 so that the first inspection surface 110 is inclined along the third direction Z.

The second reference member 200 may be provided with a rod shape having a second length le2. The second length le2 may be provided to be equal to the first length le1. The second length le2 may be provided to be shorter or longer than the first length le1. The second reference member 200 may be attached to the external surface of the second target member S2 so that the length direction of the second reference member has the first direction X (e.g., the reference direction). For example, the second reference member 200 may be attached to at least one of the top, side and bottom surfaces of the second target member S2. The second reference member 200 may be located to be vertically aligned with the first reference member 100. The second reference member 200 may be differently located from the first reference member 100 in the second direction Y. One surface of the second reference member 200 may include a second inspection surface 210. The second inspection surface 210 may be formed as a plane. The second inspection surface 210 may be provided on a side of the second reference member 200 perpendicular to the length direction of the second reference member 200. The second inspection surface 210 may be provided as a material that may reflect light. For example, the second inspection surface 210 may be provided with a mirror. The second inspection surface 210 may be separately prepared and attached to the external surface of the second reference member 200. According to an example embodiment, the second inspection surface 210 may also be integrated with some other parts of the second reference member 200. The second reference member 200 may be attached to the second target member S2 so that the second inspection surface 210 is provided along the same direction as the first inspection surface 110.

Figure 2:
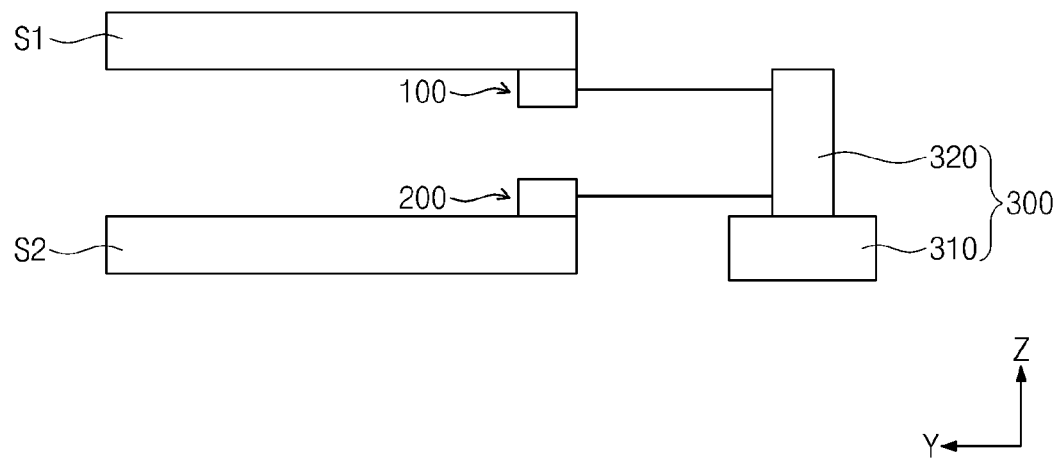
FIG. 2 is a front view of the measuring system of FIG. 1.

FIG. 2 is a front view of the measuring system of FIG. 1.

Referring to FIGS. 1 and 2, the measuring unit 300 includes a guide member 310 and a measuring member 320. The measuring unit 300 is located at a distance from the first reference member 100 and the second reference member 200 in a direction perpendicular to the length direction of the first reference member 100. The measuring unit 300 measures a relative location in the measuring direction perpendicular to the first direction X, the reference direction along which the first reference member 100 and the second reference member 200 are provided in a length direction.

The guide member 310 may be provided with a rod shape having a certain length. The length of the guide member 310 may correspond to the first length le1. The guide member 310 may be located so that its length direction has the first direction X. When viewed from above, the guide member 310 may be located to be aligned with the first reference member 100 in the second direction Y and face the first inspection surface 110.

The measuring member 320 may be configured to move in the first direction X along the guide member 310. Measuring distances using one of the first inspection surface 110 and the second inspection surface 210, the measuring member 320 may measure a location change or a distance difference with respect to the other of the first inspection surface 110 and the second inspection surface 210, in the measuring direction perpendicular to the first direction X (e.g., the reference direction). For example, the measuring member 320 may be provided with an interferometer. The measuring member 320 may be provided with a differential interferometer that radiates two lights L1 and L2 to the first inspection surface 110 and the second inspection surface 210, respectively, then have reflected lights L1 and L2 interfere with each other, and measure a distance difference of a path through which each light L1 or L2 moves.

The measuring member 320 may radiate a first light L1 and a second light L2 perpendicularly to the first inspection surface 110 and the second inspection surface 210, respectively. For example, when the first inspection surface 110 and the second inspection surface 210 are provided to face the measuring member in the second direction Y, the measuring member 320 may radiate the first light L1 and the second light L2 travelling in the second direction Y to the first inspection surface 110 and the second inspection surface 210, respectively. The measuring member 320 may have the first light L1 reflected from the first inspection surface 110 and the second light L2 reflected from the second inspection surface 210 interfere with each other to measure a moving path difference between the first light L1 and the second light L2. Thus, it is possible to measure the relative location of one of the first target member S1 and the second target member S2 with respect to the other in the second direction Y. In case that the first inspection surface 110 and the second inspection surface 210 are provided to be inclined along the third direction Z, the measuring unit 300 may radiate the first light L1 and the second light L2 so that the lights travel in a direction facing the first inspection surface 110 and the second inspection surface 210. By having the first light L1 and the second light L2 reflected from the first inspection surface 110 and the second inspection surface 210 interfere with each other, it is possible to measure a moving path difference between the first light L1 and the second light L2. Furthermore, it is possible to measure the moving path difference component in the second direction Y on a moving path by using a trigonometric function. Thus, it is possible to measure the relative location of one of the first target member S1 and the second target member S2 with respect to the other in the second direction Y.

In the following, some example embodiments are described in which the first inspection surface 110 and the second inspection surface 210 are provided to face the measuring unit 300 in the second direction Y (e.g., the measuring direction) and the first light L1 and the second light L2 are radiated to travel in the second direction Y. However, the first inspection surface 110 and the second inspection surface 210 may be provided to be inclined toward the third direction Z, and the first light L1 and the second light L2 may be radiated to travel in a direction perpendicular to the first inspection surface 110 and the second inspection surface 210, as described above.

The first light L1 and the second light L2 may be equal to or different from each other in wavelength.

Figure 3:
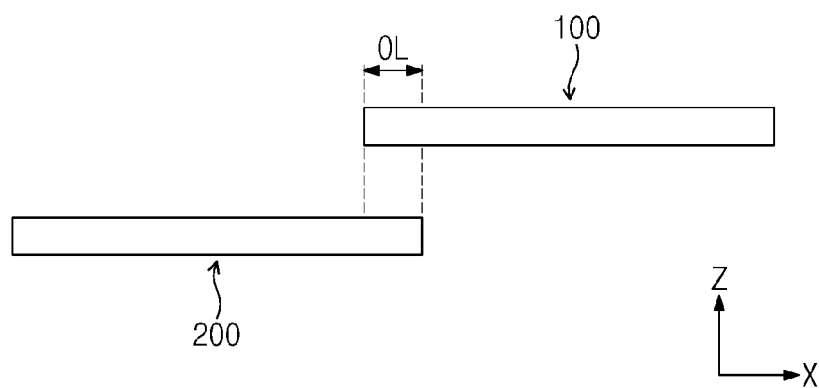
FIG. 3 represents a first reference member and a second reference member when viewed from a second direction.

FIG. 3 represents the first reference member and the second reference member when viewed from the second direction.

Figure 7:
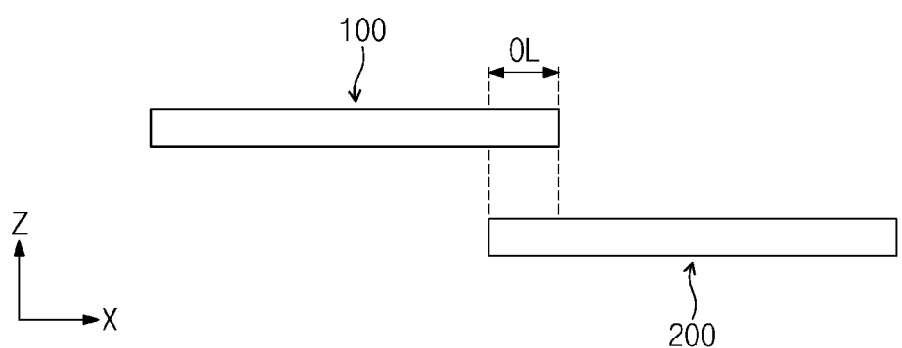
FIG. 7 represents a first reference member and a second reference member in FIG. 6 when viewed from a second direction.

In the following, a point at which the second target member S2 is initially located for measurement as illustrated in FIG. 1 may be referred to as a front point, and a point at which measurement ends as illustrated in FIG. 7 may be referred to as a rear point. For example, in the case of the first direction X, a moving direction toward the front point may be referred to as a forward direction and a moving direction toward the rear point may be referred to as a backwards direction.

Referring to FIGS. 1 to 3, the second target member S2 may be located at the front point and then the measuring unit 300 starts measurements. When the second target member S2 is located at the front point, a front portion of the first reference member 100 and a rear portion of the second reference member 200 may be provided to overlap in the first direction X. Further, the measuring member 320 may be located at the front portion of the guide member 310 so that the measuring member 320 is located at a distance in the second direction Y from the section OL where the first reference member 100 and the second reference member 200 overlap with each other. The measuring member 320 may radiate the first light L1 and the second light L2 to the first inspection surface 110 and the second inspection surface 210, respectively, and then may have the reflected first light L1 and the reflected second light L2 interfere with each other to measure the relative location of one of the first reference member 100 and the second reference member 200 with respect to the other in the second direction Y.

Figure 4:
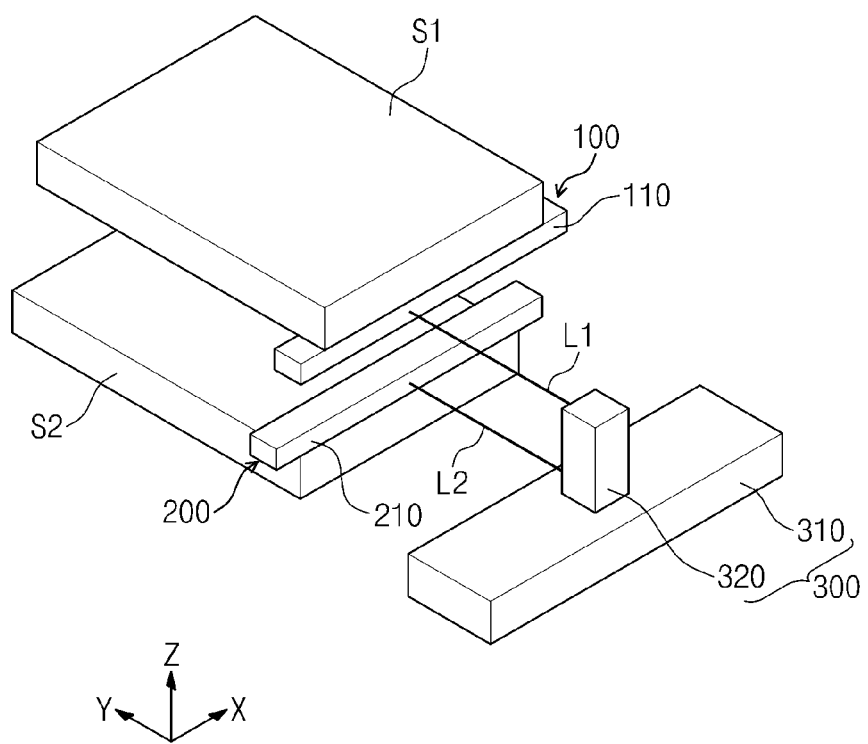
FIG. 4 represents when a second target member has moved in a first direction.
Figure 5:
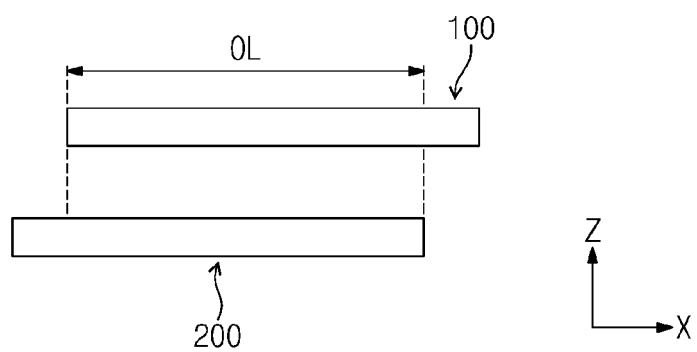
FIG. 5 represents a first reference member and a second reference member in FIG. 4 when viewed from a second direction.

FIG. 4 represents when a second target member has moved in a first direction, and FIG. 5 represents a first reference member and a second reference member in FIG. 4 when viewed from a second direction.

Referring to FIGS. 4 and 5, the second target member S2 is configured to move in the backwards direction in the first direction X. The second target member S2 may have an error that deviates from a moving path in a moving process. When the second target member S2 moves in the second direction Y with respect to a moving path in a moving process, the relative location between the first target member S1 and the second target member S2 in the second direction may changes. Thus, using the relative location of one of the first reference member 100 and the second reference member 200 sensed by the measuring member 320 with respect to the other, it is possible to measure the error caused by a deviation from a moving path in the second direction Y.

Firstly, the second target member S2 moves toward the rear point. An overlap section OL is formed between the front portion of the first reference member 100 and the rear portion of the second reference member 200 as the second target member S2 starts a movement and until the second target member S2 moves to a certain extent. The measuring member 320 may be located on a point, which is at a distance in the second direction Y from a point of the overlap section OL to measure the relative location of one of the first reference member 100 and the second reference member 200 with respect to the other in the second direction Y. For example, the measuring member 320 may perform measurement by moving in the backwards direction. For example, a velocity at which the measuring member 320 may move may be the same as or different from a velocity at which the second target member S2 moves. While the overlap section OL is being formed between the front portion of the first reference member 100 and the rear portion of the second reference member 200, the measuring member 320 may perform measurement without a movement, for example, at the location where it initially started measurement. According to an example embodiment, the measuring member 320 may perform measurement for a certain time without a movement, for example, at the location where it initially started measurement, and then perform measurement on the move.

Figure 6:
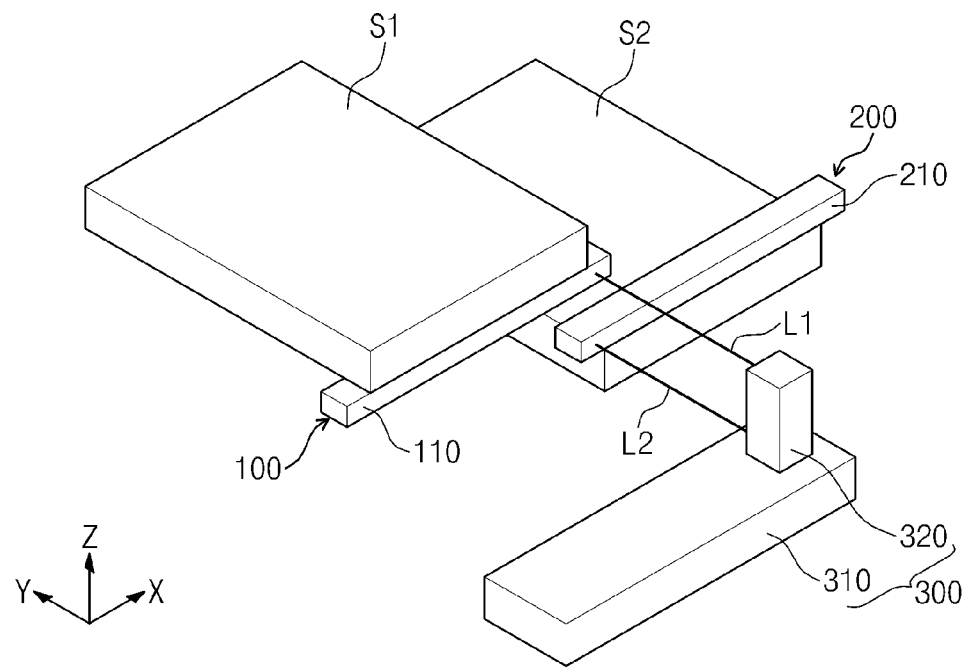
FIG. 6 represents when a second target member has further moved in the first direction than in FIG. 4.

FIG. 6 represents when a second target member has further moved in the first direction than in FIG. 4, and FIG. 7 represents a first reference member and a second reference member in FIG. 4 when viewed from a second direction.

Referring to FIGS. 6 and 7, the measuring member 320 may measure the relative location of one of the first reference member 100 and the second reference member 200 with respect to the other in the second direction Y while it is located at a distance in the second direction Y from the overlap section OL between the first and reference member 100 and the second reference member 200. When the second target member S1 continues to move, the overlap section OL may be formed between the front portion of the second reference member 200 and the rear portion of the first reference member 100. When the second target member S2 moves a distance exceeding a threshold distance (e.g., the first length le1 of the first reference member 100), the front portion of the overlap section OL moves in the first direction X from the front portion of the first reference member 100. Thus, the measuring member 320 moves in the first direction X according to the movement of the front portion of the overlap section OL so that the measuring member 320 can be located at a distance from the overlap section OL in the second direction Y. For example, the measuring member 320 may perform measurement, moving at a constant velocity. The measuring member 320 may perform measurement by moving at different velocities in different sections. The measuring member 320 may perform measurement, repeating a movement and a stop once or more.

The second target member S2 may move to the rear point and then stop. For example, the overlap section OL may be located at the rear portion of the first reference member 100. The measuring member 320 may perform measurement on the move such that the measuring member 320 is located at a distance from a point of the overlap section OL in the second direction Y. Further, when the second target member S2 stops at the rear point, the measuring member 320 finishes its operation of measuring the relative location between the first target member S1 and the second target member S2.

According to an example embodiment, the measuring member 320 may use the overlap section OL between the first reference member 100 and the second reference member 200 to measure the relative location of one of the first target member S1 and the second target member S2 with respect to the other. The front or rear portion of the overlap section OL moves as the second target member S2 moves. Thus, the measuring member 320 may perform measurement while moving at a distance from the overlap section OL in the second direction Y.

The distance that the second target member S2 may move while forming the overlap section OL may be approximately equal to the sum of the first length le1 of the first reference member 100 and the second length le2 of the second reference member 200.

Figure 8:
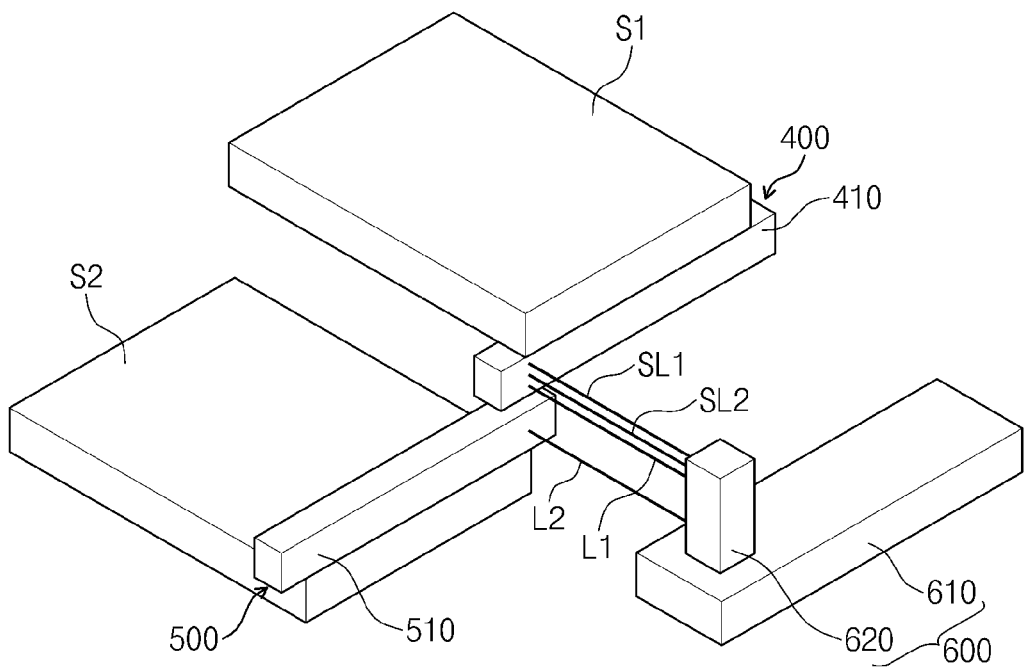
FIG. 8 represents a measuring system according to another example embodiment.

FIG. 8 represents a measuring system according to another example embodiment.

Referring to FIG. 8, a measuring system 11 includes a first reference member 400, a second reference member 500, and a measuring unit 600.

The first reference member 400 and the second reference member 500 may be provided to be the same as or similar to the first reference member 100 and the second reference member 200 of the first measuring system 10 of FIG. 1, respectively.

Figure 9:
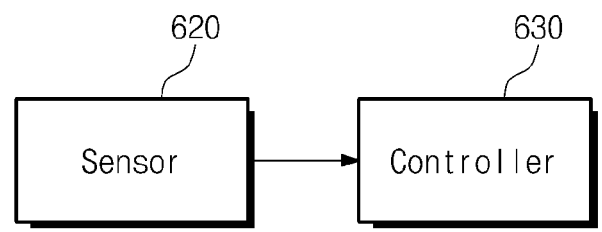
FIG. 9 is a block diagram of a portion of a measuring unit of the measuring system in FIG. 8.

FIG. 9 is a block diagram of a portion of a measuring unit of the measuring system in FIG. 8.

Referring to FIGS. 8 and 9, the measuring unit 600 includes a guide member 610, a sensor 620, and a controller 630.

The guide member 610 may be provided to be the same as or similar to the guide member 310 of the measuring unit 300 in FIG. 1.

The sensor 620 may function as a measurement unit by radiating the first light L1 and the second light L2 to the first reference member 400 and the second reference member 500, respectively, and measuring the relative location of one of the first target member S1 and the second target member S2 with respect to the other. A method of radiating the first light L1 and the second light L2 by the sensor 620 and a method of measuring the relative location of one of the first target member S1 and the second target member S2 with respect to the other by the measuring system 11 may be the same as or similar to the method of radiating the first light L1 and the second light L2 by the measuring member 320 in FIG. 1 and the method of measuring the relative location one of the first target member S1 and the second target member S2 with respect to the other by the measuring system 10 of FIG. 1.

Figure 10:
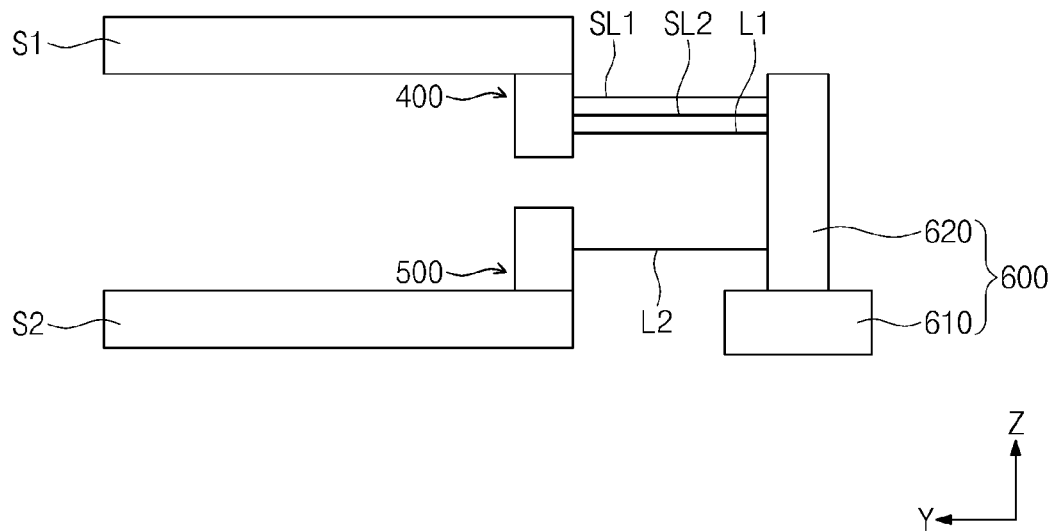
FIG. 10 illustrates the measuring system of FIG. 8 when viewed from a first direction.

FIG. 10 illustrates the measuring system of FIG. 8 when viewed from a first direction.

Referring to FIGS. 8 to 10, the measuring member 620 radiates a first auxiliary light SL1 and a second auxiliary light SL2. The first auxiliary light SL1 and the second auxiliary light SL2 may be radiated to one of the first reference member 400 and the second reference member 500. For example, the first auxiliary light SL1 and the second auxiliary light SL2 may be radiated to the first reference member 400.

The measuring unit 600 may radiate the first auxiliary light SL1 and the second auxiliary light SL2 perpendicularly to a first inspection surface 410. For example, when the first inspection surface 410 is oriented to face the measuring unit 600 in the second direction Y, the measuring unit 600 may be configured to radiate the first auxiliary light SL1 and the second auxiliary light SL2, which travels in the second direction Y, to the first inspection surface 410 and the second inspection surface 510. The first auxiliary light SL1 and the second auxiliary light SL2 may be radiated at different locations in the third direction Z. The first auxiliary light SL1 and the second auxiliary light SL2 may be radiated at the same or different coordinates in the second direction Y. The measuring unit 600 may have the auxiliary second light SL2 and the first auxiliary light SL1 reflected from the first inspection surface 410 interfere with each other to measure a relative moving path difference between the first auxiliary light SL1 and the second auxiliary light SL2. When the first inspection surface 410 is inclined toward the third direction Z, the measuring unit 600 radiates the first auxiliary light SL1 and the second auxiliary light SL2 so that the lights travel in a direction facing the first inspection surface 410. Furthermore, by having the first auxiliary light SL1 and the second auxiliary light SL2 reflected from the first inspection surface 410 interfere with each other, it is possible to measure a relative moving path difference between the first auxiliary light SL1 and the second auxiliary light SL2. In the case that the measuring unit 600 moves along the guide member 610 and the measuring unit 600 is not inclined along the first direction X, a reference direction, the relative moving path difference between the first auxiliary light SL1 and the second auxiliary light SL2 may be equally maintained.

Figure 11:
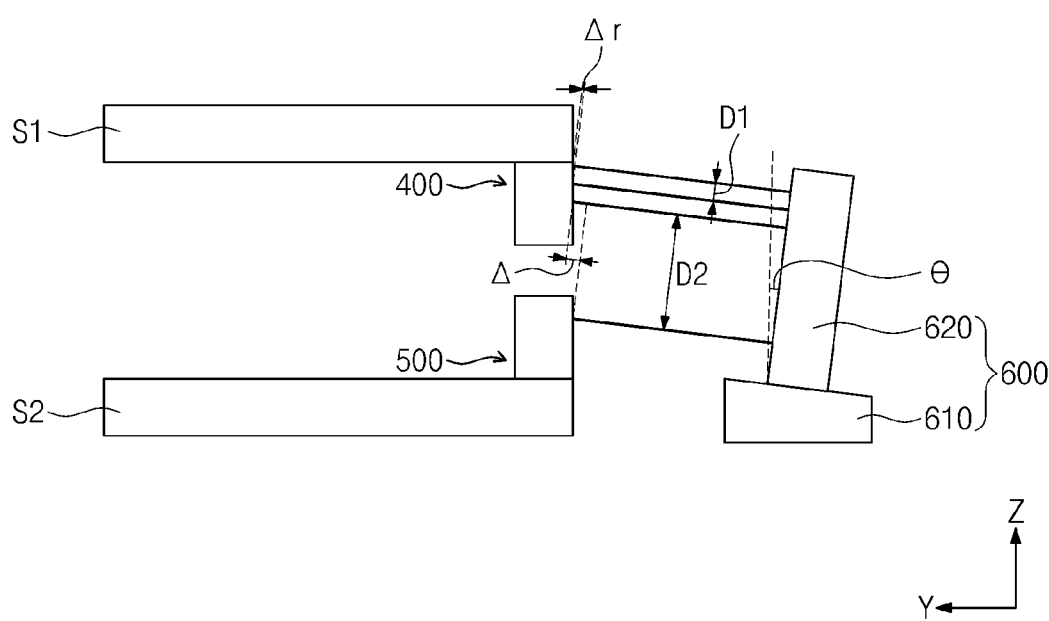
FIG. 11 illustrates the measuring system of FIG. 8 when viewed from a first direction, when a measuring member is inclined.

FIG. 11 illustrates the measuring system of FIG. 8 when viewed from a first direction, when a measuring member is inclined.

Referring to FIG. 11, the measuring member 620 may be inclined during operation. For example, the guide member 610 may have different shapes at different portions thereof along its length direction, along which the guide member 610 is connected to the measuring member 620. Such non-uniformity in shape of the guide member 610 may cause the measuring member 620 to incline while the measuring member 620 moves along the guide member 610. When the measuring member 620 is inclined in the first direction X (e.g., a reference direction), a path through which lights L1, L2, SL1 and SL2 radiated from the measuring member 620 travel may change.

For example, when the upper portion of the measuring member 620 may be inclined to be further away from the first reference member 400 in the third direction Z, distances that the lights L1, L2, SL1 and SL2 travel increase according to the height of the measuring member 620. Such a change of a distance causes an error in a measurement result. A level of inclination of the measuring member 620 is exaggerated in FIG. 11 for the convenience of description and the lights L1, L2, SL1 and SL2 reflected from the inspection surfaces 410 and 510 may re-enter the measuring member 620 to be used for measurement.

For example, there is a relationship among a corrected path difference $\Delta r$ measured through the auxiliary lights SL1 and SL2, a distance D1 between the first auxiliary light SL1 and the second auxiliary light SL2 in the third direction Z, and an angle of inclination $\theta$ of the measuring member 620.

$$\Delta r = D1 \times \theta \qquad \text{<Equation 1>}$$

The control member 630 may process a value measured by the measuring member 620. Firstly, the control member 630 may process data related to the auxiliary lights transmitted from the measuring member 620 to calculate the corrected path difference $\Delta r$ and/or the angle of inclination of the measuring member 620 using the corrected path difference Δr through the above-described equation. Further, the control member 630 may use the corrected path difference and/or the angle of inclination θ of the measuring member 620 to correct an error in measurement value of lights caused due to the inclination of the measuring member 620. The control member 630 may be, for example, an arithmetic logic unit, a digital signal processor, a microcomputer, a field programmable array, a programmable logic unit, a microprocessor or any other device configured to process the value measured by the measuring member 620 in a defined manner such that the control member 630 is a processing device configured as a special purpose machine to perform the foregoing processing.

For example, when the coordinates of the first inspection surface 410 and the second inspection surface with respect to the measuring member 620 are substantially equal in the second direction Y, there is a relationship among a modified path difference Δ between the first light L1 and the second light L2, a distance D1 between the auxiliary lights SL1 and SL2 in the third direction Z, a distance D2 between the lights L1 and L2 in the third direction Z, and the angle of inclination θ of the measuring member 620.

$$\Delta = D2 \times \theta \qquad \langle\text{Equation 2}\rangle$$

$$\Delta = \frac{D2}{D1} \times \Delta r \qquad \langle\text{Equation 3}\rangle$$

When the coordinates of the first inspection surface 410 and the second inspection surface 210 in the second direction Y are different, the control member 630 may find the modified path difference using an equation similar to Equation 2 or 3 above by further considering the distance between the first inspection surface 410 and the measuring member 620 and the distance between the second inspection surface 210 and the measuring member 620.

The measurement of the inclination of the measuring member 620 and correction of an error value caused by the inclination of the measuring member 620 may be performed together. For example, the measuring member 620 may radiate the first auxiliary light SL1 and the second auxiliary light SL2 in the process of measuring the relative location of one of the first target member S1 and the second target member S2 with respect to the other. Further, the control member 630 may receive data measured using the lights L1 and L2 and the auxiliary lights SL1 and SL2, find the corrected path difference Δr and/or the angle of inclination θ, and modify data measured using the lights L1 and L2.

The control member 630 may first measure whether the measuring member 620 is inclined depending on locations of the guide member 610 in its length direction, and/or a level of inclination. For example, the measuring member 620 may radiate the auxiliary lights SL1 and SL2 to the first reference member 400, moving along the guide member 610. In this case, the lights L1 and L2 may or may not be radiated. The control member 630 calculates the corrected path difference Δr and/or the angle of inclination θ of the measuring member 620 based on the measurement values of the auxiliary lights SL1 and SL2. Further, the control member 630 may store the corrected path difference Δr and/or the angle of inclination θ of the measuring member 620 in association with locations of the measuring member 620. Then, the measuring member 620 may radiate the first light L1 and the second light L2 to measure the relative location of one of the first target member S1 and the second target member S2 with respect to the other. The control member 630 may uses a pre-stored corrected path difference Δr and/or a pre-stored angle of inclination θ of the measuring member 620 to modify data measured using the lights L1 and L2.

According to some example embodiments, measuring systems and/or methods that measure a relative location of one of the target members with respect to the other in a measuring direction, which is perpendicular to a reference direction may be provided.

According to some example embodiments, measuring systems (and/or measuring methods using one of the measuring systems), in which measuring members move a long distance in a direction perpendicular to a measuring direction, may be formed while the relative location of a second target member with respect to the first target member is measured in the measuring direction.

According to some example embodiments, measuring systems and/or methods that correct an error included in measured data may be provided.

The detailed description above shows a few example embodiments of the present inventive concepts. Also, the above description represents some example embodiments and the present inventive concepts may be variously modified. That is, it is possible to make changes or modifications within the scope of the concepts of the invention disclosed herein, within a scope equivalent to the disclosure and/or within the scope of the technique or knowledge of the related art. The detailed description of the inventive concepts is not intended to limit the present inventive concepts to the example embodiments disclosed. Thus, the following claims should be construed to include other example embodiments.

What is claimed is:

1. A measuring system comprising:
   a first reference member at one of a first target member and a second target member, at least one of the first and second target members being configured to move relative to each other in a first direction, and the first reference member having a first length;
   a second reference member at the other of the first target member and the second target member, the second reference member having a second length, the first reference member and the second reference member configured to at least partially overlap each other in the first direction to provide an overlapping section, the first direction being a direction along which the first length and the second length extend; and
   a measuring unit at a distance from the first reference member and the second reference member, the measuring unit being at a distance from the overlapping section in a second direction perpendicular to the first direction, the measuring unit including,
      a differential interferometer configured to radiate a first light to the first reference member and a second light to the second reference member, respectively, such that the first light reflected from the first reference member and the second light reflected from the second reference member interfere with each other, and
      a controller configured to calculate a relative location of one of the first reference member and the second reference member with respect to the other.

2. The measuring system of claim 1, wherein the first reference member and the second reference member are configured to move relative to each other in a direction parallel to a moving direction of the differential interferometer.

3. The measuring system of claim 1, wherein the measuring unit further comprises:
a guide member having a rod shape; and
wherein the differential interferometer is configured to move along the guide member.

4. The measuring system of claim 3, wherein a length direction of the differential interferometer is equal to one of the length directions of the first reference member and of the second reference member.

5. The measuring system of claim 3, wherein a length of the guide member is substantially equal to the first length.

6. The measuring system of claim 3, wherein the guide member is aligned with the first reference member and the guide member is at a distance from the first reference member.

7. The measuring system of claim 3, wherein the differential interferometer is configured to radiate a first light to the first reference member and a second light to the second reference member.

8. The measuring system of claim 7, wherein the differential interferometer is configured to radiate a first auxiliary light and a second auxiliary light to at least one of the first reference member and the second reference member.

9. The measuring system of claim 8, wherein the controller is further configured to correct an error in data measured using the first light and the second light based on data measured using the first auxiliary light and the second auxiliary light.

10. The measuring system of claim 1, wherein the differential interferometer moves in the first direction.

11. A measuring method comprising:
moving a second reference member relative to a first reference member in a length direction thereof, while maintaining the first reference member and the second reference member to at least partially overlap each other in the length direction to provide overlapping section, the length direction being a direction along which a length of the first reference member and a length of the second reference member extend;
radiating, by a measuring unit, a first light to the first reference member and a second light to the second reference member at a distance from the overlapping section in a radiation direction, the radiation direction being a direction perpendicular to the length direction, to cause an interference between the first light reflected from the first reference member and the second light reflected from the second reference member; and
measuring a relative location of one of the first reference member and the second reference member with respect to the other based on the interference.

12. The measuring method of claim 11, wherein the radiating radiates the first light and the second light to the first reference member and the second reference member, respectively, in the overlap section while moving the measuring unit on a guide member.

13. The measuring method of claim 12, wherein the guide member has a length substantially equal to the length of the first reference member.

14. The measuring method of claim 11, further comprising:
radiating, using the measuring unit, a first auxiliary light and a second auxiliary light to at least one of the first reference member and the second reference member such that the first auxiliary light reflected and the second auxiliary light reflected interfere with each other to measure an angle of inclination of the measuring unit; and
correcting, using the angle of inclination, a relative location of one of the first reference member and the second reference member with respect to the other.

15. A measuring system comprising:
a first reference member and a second reference member, at least one of the first and second reference members configured to move relative to the other in a first direction, the first reference member overlapping the second reference member configured to at least partially overlap each other in the first direction to provide an overlapping section, the first direction being a direction along which a length of the first reference member and a length of the second reference member extend;
a sensor configured to radiate measuring lights at a distance to the first reference member and the second reference member, respectively, and receive reflected measuring lights such that the measuring lights reflected from the first and second reference members interfere with each other to form reflected measuring lights, the sensor being at a distance from the overlapping section in a second direction, the second direction being a direction perpendicular to the first direction; and
a controller configured to determine a relative location of one of the first reference member and the second reference member with respect to the other based on the reflected measuring lights.

16. The measuring system of claim 15, wherein the sensor is configured to radiate the measuring lights, which includes a first light corresponding to the first reference member and a second light corresponding to the second reference member.

17. The measuring system of claim 16, wherein the controller is configured to correct an error in data measured using the first light and the second light.

18. The measuring system of claim 16, wherein the sensor is configured to further radiate a first auxiliary light and a second auxiliary light to at least one of the first reference member and the second reference member.

19. The measuring system of claim 18, wherein the controller is configured to correct an error in data measured using the first light and the second light based on data measured using the first auxiliary light and the second auxiliary light.

20. The measuring system of claim 15, wherein the sensor moves in the first direction.

* * * * *